United States Patent
Cernusca et al.

(10) Patent No.: US 6,674,361 B2
(45) Date of Patent: Jan. 6, 2004

(54) METHOD AND SYSTEM FOR DETERMINING THE POSITION OF A WANTED OBJECT WHICH IS POSITIONED IN A ROW OF OBJECTS AND IS PROVIDED WITH A TRANSPONDER

(75) Inventors: Michael Cernusca, Judendorf (AT); Dirk Morgenroth, Graz (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 166 days.

(21) Appl. No.: 09/902,921

(22) Filed: Jul. 11, 2001

(65) Prior Publication Data

US 2002/0014965 A1 Feb. 7, 2002

(30) Foreign Application Priority Data

Jul. 13, 2000 (EP) .............................................. 00890220

(51) Int. Cl.$^7$ ........................... G08B 13/14; G05B 19/00
(52) U.S. Cl. ................. 340/505; 340/572.1; 340/572.2; 340/572.5; 340/5.92; 235/385; 705/22; 705/28
(58) Field of Search .............................. 340/505, 572.1, 340/572.3, 572.4, 572.5, 572.2, 5.86, 5.9, 5.91, 5.92, 10.1, 10.51; 235/375, 381, 385; 705/22, 28

(56) References Cited

U.S. PATENT DOCUMENTS

| 5,063,380 A | * | 11/1991 | Walkura ................. 340/825.49 |
| 5,648,765 A | * | 7/1997 | Cresap et al. ............... 340/10.4 |
| 5,812,065 A | * | 9/1998 | Schrott et al. ............... 340/505 |
| 5,936,527 A | | 8/1999 | Isaacman et al. ......... 340/572.1 |
| 6,369,965 B1 | * | 4/2002 | Dames et al. ............ 340/572.1 |
| 6,393,045 B1 | * | 5/2002 | Belcher et al. .......... 340/10.41 |

* cited by examiner

*Primary Examiner*—Donnie L. Crosland
(74) *Attorney, Agent, or Firm*—Aaron Waxler

(57) ABSTRACT

In a method and a system (1) for determining a position (d) of a wanted object (BKn) fitted with a transponder (TRn), scanning signals (INTnle, INTnri) with current strengths (Ire, Iri) changed (reduced) in steps and starting from a starting value (maximum value) are supplied to a left transmission coil (9) and separately therefrom to a right transmission coil (10), and it is determined by detection means (15, 16) when the transponder (TRn) associated with the wanted object (BKn) has changed its behavior between delivery and non-delivery of its response signal (RESn), whereupon those values V(Ii+1), V(Ik+1) of the changed (reduced) current strengths (Ii+1, Ik+1) are determined at which the transponder (TRn) has changed its behavior between delivery and non-delivery of its response signal (RESn), and the position (d) of the wanted object (BKn) is subsequently determined from said values V(Ii+1), V(Ik+1).

11 Claims, 2 Drawing Sheets

Figure 1:
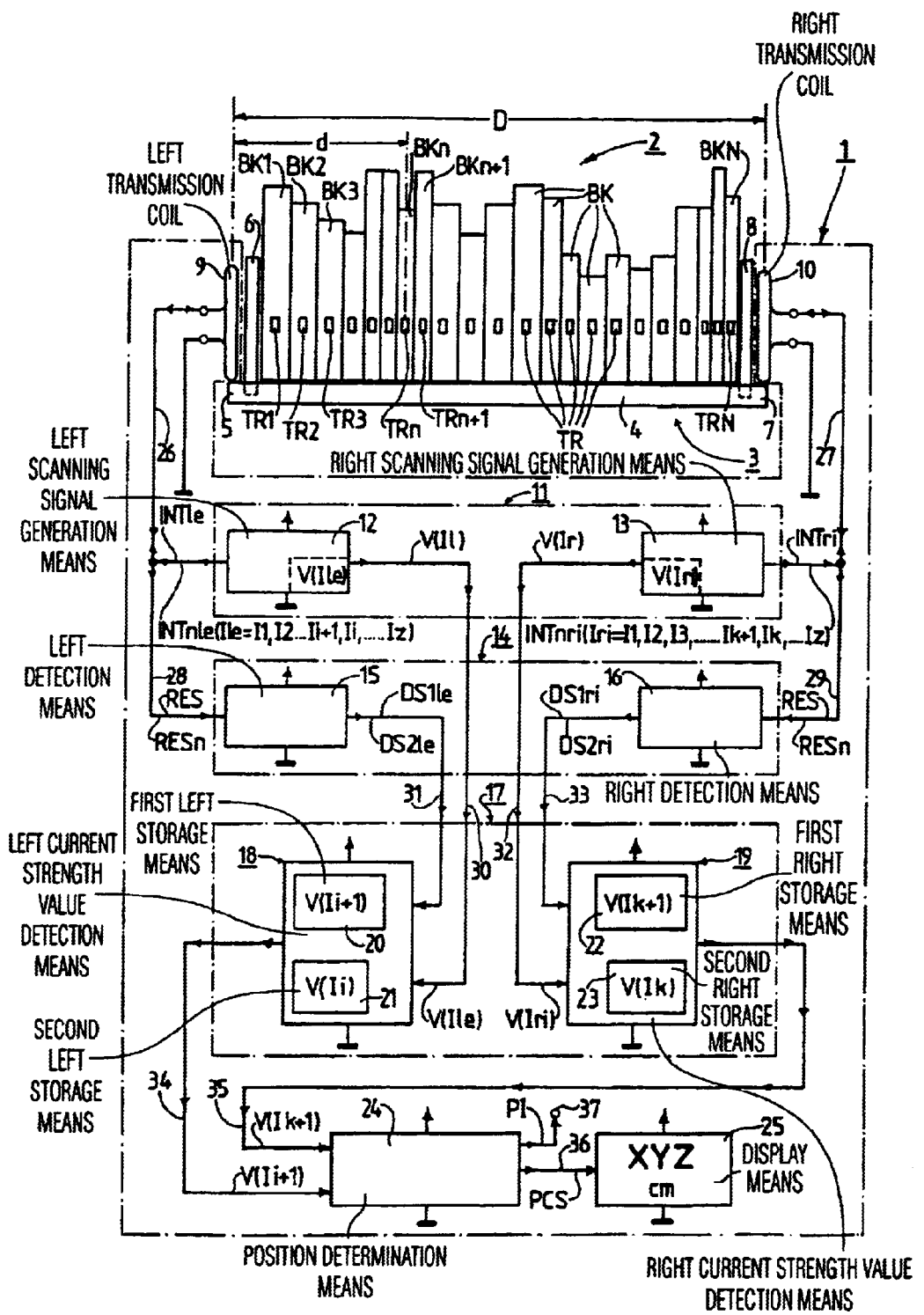

METHOD AND SYSTEM FOR DETERMINING THE POSITION OF A WANTED OBJECT WHICH IS POSITIONED IN A ROW OF OBJECTS AND IS PROVIDED WITH A TRANSPONDER

The invention relates to a method of determining the position of a wanted object which is positioned in a row of objects, said objects being each provided with a transponder.

The invention also relates to a system for determining the position of a wanted object which is positioned in a row of objects, said objects being each provided with a transponder.

Such a method and such a system are known from the patent document U.S. Pat. No. 5,936,527 A. A method and a system for determining the position of a wanted object are known from the patent document U.S. Pat. No. 5,936,527 A, according to which the position of a wanted object can only be determined as being within a given shelf or within a given drawer. This means that it is indeed possible to determine exactly the shelf carrying the wanted object from among a plurality of shelves or the drawer containing the wanted object from among a plurality of drawers for finding a wanted object, but that subsequently the wanted object is to be individually located on the determined shelf or in the determined drawer by means of a manually performed search, which represents an additional, undesirable effort. Because of this fact, an automatic removal of a wanted object from the determined shelf or drawer is not possible either.

The invention has for its object to eliminate the limitations described above and to provide an improved method and an improved system.

To achieve the object mentioned above, according to the invention, a method as mentioned in the opening paragraph is characterized in that a left scanning signal for triggering a response signal of a transponder, with which the wanted object is fitted, is supplied with a left current strength having a starting value to a left transmission coil which is provided at a left-hand end of the row of objects, and in that subsequently the left scanning signal for triggering the response signal of the transponder, with which the wanted object is fitted, is supplied to the left transmission coil with left current strengths changed in steps, such that a change in accordance with a minimum current value difference is carried out upon changing of the left current strength, and in that it is ascertained for each step whether the transponder, with which the wanted object is fitted, has given off the response signal triggered by means of the left scanning signal supplied to the left transmission coil, and in that the value is determined of that changed left current strength of the left scanning signal with which after a change of the left current strength in accordance with the minimum current value difference the left scanning signal was supplied to the left transmission coil, and in that a right scanning signal for triggering the response signal from the transponder, with which the wanted object is fitted, is supplied in a first step to a right transmission coil, which is provided at a right-hand end of the row of objects, with a right current strength having a starting value, and in that subsequently the right scanning signal for triggering the response signal of the transponder, with which the wanted object is fitted, is supplied to the right transmission coil with right current strengths changed in steps, such that a change in accordance with a minimum current value difference is carried out upon changing of the right current strength, and in that it is ascertained for each step whether the transponder, with which the wanted object is fitted, has given off the response signal triggered by means of the right scanning signal supplied to the right transmission coil, and in that the value is determined of that changed right current strength of the right scanning signal with which after a change in the right current strength in accordance with the minimum current value difference the right scanning signal was supplied to the right transmission coil, and in that the position of the wanted object is determined from the knowledge of said value of the determined changed left current strength of the left scanning signal and from the knowledge of said value of the determined changed right current strength of the right scanning signal.

To achieve the object as mentioned above, according to the invention, a system as mentioned in the second paragraph is furthermore characterized in that a left transmission coil is provided which is arranged at a left-hand end of the row of objects, and in that left scanning signal generation means are provided by means of which a left scanning signal for triggering a response signal of a transponder, with which the wanted object is fitted, can be supplied in a first step to the left transmission coil with a left current strength having a starting value, and by means of which subsequently the left scanning signal can be supplied to the left transmission coil with current strengths changed in steps, and by means of which a change in the left current strength in accordance with a minimum current value difference is achievable, and in that left detection means are provided by means of which it can be ascertained whether the transponder, with which the wanted object is fitted, has given off the response signal triggered by means of the left scanning signal supplied to the left transmission coil, and in that left current strength value detection means are provided by means of which the value can be determined of that changed left current strength of the left scanning signal with which after a change in the left current strength in accordance with the minimum current value difference the left scanning signal was supplied to the left transmission coil, and in that a right transmission coil is provided which is arranged at a right-hand end of the row of objects, and in that right scanning signal generation means are provided by means of which the right scanning signal for triggering the response signal of the transponder, with which the wanted object is fitted, can be supplied in a first step to the right transmission coil with a right current strength having a starting value, and by means of which subsequently the right scanning signal can be supplied to the right transmission coil with current strengths changed in steps, and by means of which a change in the right current strength in accordance with a minimum current value difference is achievable, and in that right detection means are provided by means of which it can be ascertained whether the transponder, with which the wanted object is fitted, has given off the response signal triggered by means of the right scanning signal supplied to the right transmission coil, and in that right current strength value detection means are provided by means of which the value can be determined of that changed right current strength of the right scanning signal with which after a change in the right current strength in accordance with the minimum current value difference the right scanning signal was supplied to the right transmission coil, and in that position determination means are provided by means of which the position of the wanted object can be determined from the knowledge of said value of the determined changed left current strength of the left scanning signal and from the knowledge of said value of the determined changed right current strength of the right scanning signal.

The provision of the measures according to the invention renders it possible by comparatively simple means and with a comparatively small expenditure to determine the position of a wanted object present in a row of objects in a very accurate and reliable manner. The major advantage is achieved thereby that the storage location of a wanted object can be exactly determined automatically, so that an additional search for a wanted object in a manual search operation becomes redundant. Furthermore, an automatic removal of a wanted and found object from the row of objects is advantageously rendered possible thereby, because an automatic delivery device may be automatically displaced towards the wanted and found object after the determination of the wanted object, whereupon an automatic removal of the wanted and found object by means of the delivery device can take place. It is to be noted that the measures according to the invention appear to be highly advantageous in particular in libraries for the purpose of finding books. The measures according to the invention, however, are also highly advantageous in other areas of application, for example in commercial warehouses of retail businesses, or storage shelf systems in factories.

In a method according to the invention and a system according to the invention, the starting value of the left current strength and the starting value of the right current strength may each be formed by a minimum value of these two current strengths. It was found to be particularly advantageous, however, if the starting value of the left current strength and the starting value of the right current strength are each formed by a maximum value, i.e. the left scanning signal is supplied with a maximum left current strength to the left transmission coil in the first step, and the right scanning signal is supplied with a maximum right current strength to the right transmission coil in the first step. It is advantageously achieved thereby that a response signal from a wanted transponder may already be counted on in each first step, which has the result that the absence of a response signal in the first step can lead to the conclusion that the wanted transponder with which the wanted object is fitted, and accordingly the wanted object itself, is not present in a row of objects.

After the left current strength and the right current strength have each been supplied to the relevant transmission coil with a maximum value in the first step, the respective current strengths may be changed in steps, for example with constantly decreasing current value differences, in the subsequent steps. It was found to be very advantageous, however, if the left current strength and the right current strength are each changed in steps of substantially the same current value difference. This was found to be advantageous for achieving a detection process which is as simple as possible.

After the left current strength and the right current strength have each been supplied with a maximum value to the relevant transmission coils in each first step, it is possible in the subsequent steps to start with a minimum value for the two current strengths and to carry out a constant, stepwise increase in the two current strengths. It was found to be very advantageous, however, if after each first step, in which the relevant current strength is supplied to the corresponding transmission coil with a maximum value, the left scanning signal is supplied to the left transmission coil with left current strengths reduced with respect to the maximum value in steps of substantially constant current value differences, and the right scanning signal is supplied to the right transmission coil with right current strengths reduced with respect to the maximum value in steps of substantially constant current value differences. This was found to be advantageous for achieving a detection of a wanted transponder, and accordingly of a wanted object, in as fast and simple a manner as possible. Advantageously, the two maximum values are chosen to be equal, but this need not necessarily be the case. Advantageously, the current value differences are equal to the minimum current value difference in all steps.

In a method according to the invention and a system according to the invention, the exact position of a wanted object can be determined on the basis of said values of the detected reduced left current strength of the left scanning signal and the detected reduced right current strength of the right scanning signal at which the transponder, with which the wanted object is fitted, has not delivered any more response signals. It was also found to be very advantageous, however, if the position of a wanted object is determined on the basis of said values of the detected reduced left current strength of the left scanning signal and the detected reduced right current strength of the right scanning signal at which the transponder, with which the wanted object is fitted, has given off the relevant response signal for the last time before the transponder for the first time has not given such a response signal any more.

In a method according to the invention, the delivery of the response signals by a transponder with which the wanted object is fitted may be ascertained by means of a separate transmission coil, which separate transmission coil is preferably arranged between the left transmission coil and the right transmission coil. It was found to be highly advantageous, however, if in a method according to the invention the delivery of the response signals by a transponder is ascertained by means of the left transmission coil and the right transmission coil which are both present anyway. This is advantageous for achieving a system for carrying out this method which is as simple as possible.

The aspects described above as well as further aspects of the invention will become apparent from the description of an embodiment given below and are clarified with reference to this embodiment.

The invention will be explained in more detail below with reference to an embodiment shown in the drawings; however, the invention is by no means limited to this.

FIG. 1 diagrammatically shows a system according to the invention in the form of a block diagram, by means of which a method according to the invention can be implemented and which comprises a left transmission coil and a right transmission coil.

Figure 2:
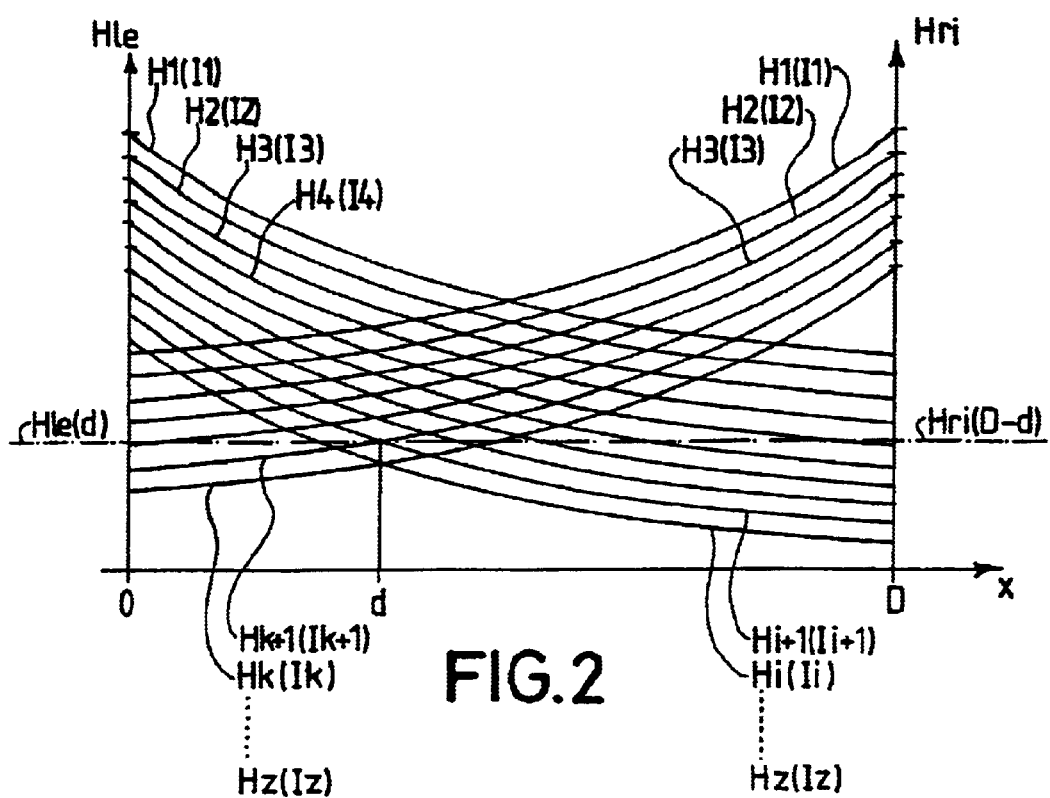

FIG. 2 is a diagram showing the field strength gradients of magnetic fields which can be generated by means of the left transmission coil and the right transmission coil of the system of FIG. 1.

FIG. 1 shows a system 1 for determining the position of a wanted object, which object is positioned in a row of objects. The objects are formed by books BK in the present case, arranged in a row 2 of books BK. In FIG. 1, some of the books BK from among the books BK have been given numbered reference symbols, i.e. the symbols BK1, BK2, BK3, . . . , BKn, BKn+1, . . . , BKN. The books BK are arranged in upright position in a book case 3, which book case comprises a shelf 4 which is bounded at its left-hand end 5 by a left end wall 6 and at its right-hand end 7 by a right end wall 8. The books BK are arranged between the two end walls 6 and 8.

Each of the books BK1 to BKN is fitted with a transponder TR, some of which have been given numbered reference symbols in FIG. 1, i.e. the symbols TR1, TR2, TR3, . . . , TRn, TRn+1, . . . , TRN.

A left transmission coil 9 and a right transmission coil 10 are provided in the system 1. The left transmission coil 9 is positioned at a left-hand end of the row 2 of books BK. The right transmission coil 10 is arranged at a right-hand end of the row 2 of books BK. The distance D between the two transmission coils 9 and 10 is chosen such that each of the transponders TR1 to TRN can be reached and energized with either of the two transmission coils 9 and 10.

It is to be noted with respect to the transponders TR that each transponder TR is characterized by a typical nominal minimum field strength at which each transponder TR should still be energized and should respond, and that each transponder TR is characterized by an actual minimum field strength which differs from the typical nominal minimum field strength because of manufacturing tolerances, so that the transponders TR1 to TRN are characterized by actual minimum field strengths which are different from one another. From higher field strengths down to the actual minimum field strength characteristic of a transponder TR, the transponder TR will be energizable by means of a scanning signal INTle or INTri provided thereto, and the relevant transponder TR will deliver a response signal RES after processing of the scanning signal INTle or INTri.

In the present case, the transponders TR are formed by so-called passive transponders, i.e. the power supply of each transponder is achieved by means of the energy delivered by one of the two transmission coils 9 and 10. It should be noted, however, that a method according to the invention may alternatively be implemented with so-called active transponders, which each have an individual power source, for example a battery or a solar cell.

The system 1 comprises a scanning signal generation device 11 which comprises left scanning signal generation means 12 and right scanning signal generation means 13. The system 1 further comprises a detection device 14 which comprises left detection means 15 and right detection means 16. The system 1 further comprises a current strength value determination device 17 which comprises left current strength value detection means 18 and right current strength value detection means 19. First left storage means 20 and second left storage means 21 are provided in the left current strength value detection means 18. First right storage means 22 and second right storage means 23 are provided in the right current strength value detection means 19. The system 1 further comprises position detection means 24. The system 1 further comprises display means 25.

The scanning signal generation device 11 and the detection device 14 and the current strength value determination device 17 and the position detection means 24 are realized in the form of a microcomputer (not shown) in the present case.

The left scanning signal generation means 12 are connected to the left transmission coil 9 by means of an electrically conducting connection 26. It is possible by means of the left scanning signal generation means 12 to generate left scanning signals INTle which are characteristic of each transponder TR1 to TRN and which are accordingly of a mutually different arrangement, so that only a single transponder TR can be addressed with each of the scanning signals INTle. The left scanning signal generation means 12 are constructed such that they are suitable for generating and delivering the respective generated left scanning signal INTle with left current strengths Ile which are changeable in steps with constant current value differences, in the present case reducible by constant current value differences, and to supply them to the left transmission coil 9. The construction is made such in this case that the respective generated left scanning signal INTle can be delivered in a first step with a starting value, i.e. in this case with a maximum left current strength $I1$, and is subsequently reduced in steps with constant current value differences with the current strengths $I2, I3, I4, \ldots, Ii+1, Ii, \ldots, Iz$. The current value differences $I1-I2, I2-I3, I3-I4, \ldots, I+1-Ii$, etc., are equal to a minimum current value difference here, which minimum current value difference defines the resolution and accordingly the accuracy of the position detection. When a scanning signal INTle with a given left current strength Ile is delivered, the value V(Ile) of this current strength Ile is known in the left scanning signal generation means 12.

What is true for the left scanning signal generation means 12 as indicated above is true by full analogy also for the right scanning signal generation means 13. The right scanning signal generation means 13 are connected to the right transmission coil 10 via an electrically conducting connection 27. The right scanning signal generation means 13 are designed for generating different right scanning signals INTri, such that also in this case right current strengths Iri can be generated which are changeable in steps with constant current value differences, i.e. starting from a starting value which is a maximum right current strength $I1$, in steps each of the minimum current value difference with the current strengths $I2, I3, \ldots, Ik+1, Ik, \ldots, Iz$. When a given right scanning signal INTri with a given right current strength Iri is delivered, the value V(Iri) of this current strength Iri is similarly known in the right scanning signal generation means 13.

The delivery of the left scanning signals INTle to the left transmission coil 9 has the result that different field strength gradients Hle can be generated in dependence on the respective current strengths $I1, I2, \ldots, Ii+1, Ii, \ldots, Iz$ generated by the left scanning signal generation means 12, i.e. the field strength gradients $H1(I1), H2(I2), H3(I3), H4(I4), \ldots, Hi+1, Hi(Ii), \ldots, Hz(Iz)$, as is apparent from FIG. 2. Similarly, the delivery of the right scanning signals INTri to the right transmission coil 10 renders it possible to generate different field strength gradients Hri, i.e. the field strength gradients $H1(I1), H2(I2), H3(I3), \ldots, Hk+1(Ik+1), Hk(Ik), \ldots, Hz(Iz)$, as is also apparent from FIG. 2. The field strength gradients Hle and Hri here correspond to known functions f1 and f2, which will be discussed in more detail further below.

If, for example, the position of the book BKn positioned at a distance d from the left transmission coil 9 is to be exactly determined, a left scanning signal INTnle is supplied to the left transmission coil 9 by the left scanning signal generation means 12 for triggering a response signal RESn from the transponder TRn with which the wanted book BKn is fitted, i.e. initially with the maximum left current strength $I1$. Then the left scanning signal INTnle is supplied to the left transmission coil 9 with left current strengths $I2, I3, I4, \ldots, Ii+1, Ii$ reduced in steps each of the minimum current value difference by means of the left scanning signal generation means 12. Then a right scanning signal INTnri for triggering the response signal RESn from the transponder TRn, with which the wanted book BKn is fitted, is supplied with the maximum right current strength $I1$ to the right transmission coil 10 by the right scanning signal generation means 13. Subsequently, the right scanning signal INTnri is supplied to the right transmission coil 10 with right current strengths $I2, I3, \ldots, Ik+1, Ik$ reduced in steps of the minimum current value difference each time by means of the right scanning signal generation means 13.

It is important in the case considered that the scanning signals INTnle and INTnri are not supplied simultaneously to the two transmission coils 9 and 10, but that instead first the relevant scanning signal is supplied with falling current strengths to one of the two transmission coils 9 and 10 and only after that to the other one of the two transmission coils 9 and 10. In the case described above, first the left transmission coil 9 and after that the right transmission coil 10 are fed with the respective scanning signals INTnle (Ile=I1, I2, I3, I4, . . . , Ii+1, Ii, . . . , Iz) and INTnri (Iri=I1, I2, I3, . . . , Ik+1, Ik, . . . , Iz). The order may also be chosen to be the reverse, in which case first the right transmission coil 10 and only after that the left transmission coil 9 receives the respective scanning signal. Alternatively, moreover, the relevant scanning signals may be supplied alternately to the left transmission coil 9 and the right transmission coil 10 in a time multiplex operation.

After the supply of a relevant scanning signal INTle, i.e. for example the scanning signal INTnle to the transponder TRn by means of the left scanning signal generation means 12, it is ascertained by means of the left detection means 15 connected to the left transmission coil 9 via a connection 28 whether the relevant transponder TRn, with which the wanted book BKn is fitted, has given off the response signal RESn triggered by means of the left scanning signal INTnle supplied by the left transmission coil 9, or whether this is not the case. As long as the relevant transponder TRn transmits a response signal RESn to the left transmission coil 9, and this in spite of the current strengths I2, I3, I4, . . . , Ii+1, Ii reduced in steps, the left detection means 15 will give off a first left detection signal DS1le. The moment the relevant transponder TRn transmits no more response signal RESn to the left transmission coil 9, this is detected by the left detection means 15, whereupon the left detection means 15 give off a second left detection signal DS2le.

An analogous sequence occurs in the region of the right detection means 16, which are connected to the right transmission coil 10 via an electrically conducting connection 29. As long as a response signal RESn is received from the transponder TRn by the right transmission coil 10, this is recognized by the right detection means 16, and the right detection means 16 will give off a first right detection signal DS1ri. The moment the transponder TRn supplies no more response signal RESn to the right transmission coil 10, the detection means 16 again detect this, whereupon the right detection means 16 deliver a second right detection signal DS2ri.

It can thus be ascertained by means of the left detection means 15 and the right detection means 16, in other words, whether the transponder TRn has changed its behavior between delivery and non-delivery of the response signal RESn. In the present case, this change takes place from the delivery of the response signal RESn to the non-delivery of the response signal RESn.

It should be noted here that in a modification of the system 1 with which a modified process can be carried out, for example, an increase in the current strength Ile and Iri is carried out in equal steps starting from a minimum value of the left current strength Ile and a minimum value of the right current strength Iri after the supply of the scanning signals INTle and INTri, each with the maximum left current strength Ile=I1 and maximum right current strength Iri=I1 to the respective transmission coils 9 and 10, in which case then the transponder TRn will change its behavior from non-delivery of the response signal RESn to delivery of the response signal RESn, which change is again detected by the left detection means 15 and the right detection means 16, respectively.

The system 1 comprises the current strength value determination device 17 mentioned above, which comprises the left current strength value detection means 18 and the right current strength value detection means 19. The left current strength value detection means 18 are connected to the left scanning signal generation means 12 via an electrically conducting connection 30 and to the left detection means 15 via a further electrically conducting connection 31. The right current strength value detection means 19 are connected to the right scanning signal generation means 13 via an electrically conducting connection 32 and to the right detection means 16 via a further electrically conducting connection 33. The value V(Ile) of the left current strength Ile can be supplied via the connection 30 to the left current strength value detection means 18, indicating the left current strength Ile with which the left scanning signal INTle is delivered to the left transmission coil 9. In an analogous manner, the right current strength Iri is supplied via the connection 32 to the right current strength value detection means 19. The left detection signals DS1le and DS2le generated by the left detection means 15 are supplied to the left current strength value detection means 18 via the connection 31. The right detection signals DS1ri and DS2ri generated by the right detection means 16 are supplied to the right current strength value detection means 19 via the connection 33.

The instantaneous value V(Ile) supplied to the left current strength value detection means 18 can be stored in the first left storage means 20. The value V(Iri) supplied to the right current strength value detection means 19 can be stored in the first right storage means 22. As long as the left detection means 15 give off the first left detection signal DS1le, storage takes place in the first left storage means 20 of the value V(Ile) of that reduced left current strength Ile of the left scanning signal INTnle at which the transponder TRn, with which the wanted book BKn is fitted, has delivered the response signal RESn triggered by the left scanning signal INTnle supplied to the left transmission coil 9. The moment the transponder TRn gives no more response signal RESn, the value V(Ii) of the left current strength Ii of the left scanning signal INTnle at which the transponder TRn, with which the wanted book BKn is fitted, has given no more response signal RESn is stored in the second left storage means 21, i.e. because in this case the second left detection signal DS1le is supplied to the left current strength value detection means 18. Because of this fact, therefore, the value V(Ii+1) of that reduced left current strength Ii+1 of the left scanning signal INTnle is stored in the first left storage means 20 at which the transponder TRn, with which the wanted book BKn is fitted, has delivered the response signal RESn triggered by the scanning signal INTnle supplied to the left transmission coil 9 for the last time before the transponder TRn for the first time has not given such a response signal RESn any more.

A fully analogous process takes place with the right current strength value detection means 19, which has the result that, upon a first non-delivery of the response signal RESn by the transponder TRn, with which the wanted book BKn is fitted, the value V(Ik+1) is stored in the first right storage means 22, and the value V(Ik) is stored in the second right storage means 23.

As is apparent from FIG. 2 for the case under consideration here, in which the position of the book BKn is to be exactly determined, first the scanning signal INTnle is supplied to the left transmission coil 9, initially with the maximum current strength I1, by means of the left scanning signal generation means 12, which leads to the field strength gradient H1(I1). Then a stepwise reduction in the left current strength Ile each time with the minimum current value difference down to the values I2, I3, I4, . . . , takes place, which results in the field strength gradients H2(I2), H3(I3), H4(I4), ... Let us now assume that the transponder TRn has given the response signal RESn triggered by the scanning signal INTnle supplied by the left transmission coil 9 for the last time at the field strength gradient Hi+1(Ii+1), which arises in conjunction with the left current strength I(i+1). This means that the transponder TRn no longer delivers such a response signal RESn at the field strength gradient Hi(Ii) caused by the left current strength Ii. It is furthermore apparent from FIG. 2 that the field strength gradients H1(I1), H2(I2), H13(I3), ... caused by the current strengths I1, I2, I3, ... are first generated by the right transmission coil 10. Subsequently, the field strength gradient Hk+1(Ik+1) is generated, i.e. through the delivery of the right scanning signal INTnri to the right transmission coil 10 with the right current strength Ik+1. At this field strength gradient Hk+1 (Ik+1), the transponder TRn for the last time gives a response signal RESn to the right transmission coil 10. This means that at the subsequent field strength gradient Hk(Ik), caused by the right current strength Ik, no more response signal RESn is received from the right transmission coil 10.

As was noted above, the transponder TRn is characterized by an actual minimum field strength typical thereof, which actual minimum field strength has validity both in conjunction with the left transmission coil 9 and in conjunction with the right transmission coil 10. In other words, the left field strength Hle and the right field strength Hri which correspond to the actual minimum field strength mentioned above, i.e. the field strength values Hle(d) and Hri(D−d), are equal.

The field strength gradient of the left field strength Hle may be written as in the equation (1) given below:

$$Hle(x) = f1(V(Ile), x) \quad (1)$$

In an analogous manner, it is true for the field strength gradient of the right field strength Hri that equation (2) obtains:

$$Hri(D-x) = f2(V(Iri), D-x) \quad (2)$$

As was noted above, the values Hle(d) and Hri(D−d) are the same, so that the equation (3) can be derived:

$$Hle(d) = Hri(D-d) \quad (3)$$

Substitution of the equations (1) and (2) for x=d in equation (3) results in equation (4):

$$f1(V(Ile), d) = f2(V(Iri), D-d) \quad (4)$$

Both the functions f1 and f2 as well as the values V(Ile) and V(Iri) and the value D are known in the equation (4). This means that the value d can be calculated from the equation (4).

The calculation given above is carried out by the position determination means 24 of the system 1. The position determination means 24 are connected to the left current strength value detection means 18 via an electrically conducting connection 34 and to the right current strength value detection means 19 via a further electrically conducting connection 35. The value V(Ii+1) stored in the first left storage means 20 can be supplied to the position determination means 24 via the connection 34. The value V(Ik+1) stored in the first right storage means 22 can be supplied to the position determination means 24 via the connection 35.

The functions f1 and f2 are stored in the position determination means 24, i.e. in the form of a table. A storage in an alternative manner is obviously also possible. The value d can subsequently be calculated by the position determination means 24 from the functions f1 and f2 stored in the position determination means 24 and from the values V(Ii+1) and V(Ik+1) supplied to the position determination means 24, as well as from the value D stored in the position determination means 24.

After the calculation of the value d has been completed, i.e. after the position of the book BKn has been exactly determined, a position indicator signal PCS can be supplied to the display means 25 via an electrically conducting connection 36. The position indicator signal PCS has the result that the distance d of the wanted book BKn to the left transmission coil 9 is displayed on the display means 25, this distance d being equal to XYZ cm in the present case, as shown in FIG. 1.

It is possible with the position determination means 24 to generate not only the a position indicator signal PCS, but also a position information PI which can be supplied by the position determination means 24 to a terminal 37 of the system 1. From this terminal 37, the position information PI can be supplied, for example, to an external device outside the system 1. This external device may be, for example, an automatic delivery device by means of which the wanted and found book BKn can be automatically taken from the book shelf 3.

In the system of FIG. 1 as described above, the position determination means 24 are constructed for determining the position of the wanted book BKn through direct utilization of said value V(Ii+1) of the determined reduced left current strength Ii+1 of the left scanning signal INTnle and through direct utilization of said value V(Ik+1) of the determined reduced right current strength Ik+1 of the right scanning signal INTnri. This construction involves the condition that not only the values V(Ii+1) and V(Ik+1) are determined, but that also the values V(Ii) and V(Ik) are determined in all cases, because it is certain only after determination of these values V(Ii) and V(Ik) that the wanted transponder TRn has changed its status between delivery and non-delivery of the response signal RESn, i.e. from delivery to non-delivery, and that the values V(Ii+1) and V(Ik+1) are indeed those values of the left current strength Ile of the left scanning signal INTnle and of the right current strength Iri of the right scanning signal INTnri at which the left scanning signal INTnle was supplied to the left transmission coil 9 and the right scanning signal INTnri was supplied to the right transmission coil 10 after a change, a final one in this case, of the two current strengths Ile and Iri by the minimum current value difference, and at which the transponder TRn, with which the wanted book BKn is fitted, has for the last time given the response signal RESn triggered by the left scanning signal INTnle supplied to the left transmission coil 9 and the response signal RESn triggered by the scanning signal INTnri supplied to the right transmission coil 10, before the transponder TRn for the first time has not given such a response signal RESn any more. In other words, the position determination means 24 are constructed for determining the position of the wanted book BKn from the knowledge of said value V(Ii) of the determined reduced left current strength Ii of the left scanning signal INTnle and from the knowledge of said value V(Ik) of the determined reduced right current strength (Ik) of the right scanning signal INTnri.

It should be noted that the determination of the position of the transponder TRn by the position determination means 24 need not necessarily take place through direct utilization of the values V(Ii+1) and V(Ik+1), but that also an indirect utilization of the values V(Ii) and V(Ik) may take place for this purpose. It is also possible to determine the exact position of the book BKn through exclusive use of the values V(Ii) and V(Ik) without the values V(Ii+1) and V(Ik+1) being used for this.

The accuracy of determination of the position of the wanted transponder TRn obviously depends on the size of the steps with which the left current strength Ile and the right current strength Iri are changed, i.e. on the minimum current value difference. The smaller this minimum current value difference, the more accurate the determination of the position of the transponder TRn can be. Such a small step size, however, has the result that the duration of the determination process is prolonged. It may also be useful for this reason to choose a comparatively great step size and to determine the position of the relevant transponder TRn by means of an interpolation process or a similar process upon the detection of a change in the behavior of the wanted transponder TRn between delivery and non-delivery of the response signal RESn.

An alternative method according to the invention, which will be briefly described below, may also be carried out in the system 1 of FIG. 1. In the system 1, the left transmission coil 9 may be supplied in a first step with the left scanning signal INTnle with the left current strength Ile having the starting value I1, which in this case is the maximum left current strength I1. When it is subsequently determined by means of the left detection means 15 that the wanted transponder TRn has given its response signal RESn, the result will be that the left detection means 15 generate the first detection signal DS1le. This first detection signal DS1le is then supplied to the left scanning signal generation means 12, which has the result that the left scanning signal generation means 12 in the next step generate the left scanning signal INTnle with a current strength I1·½, i.e. halved with respect to the maximum left current strength I1, and supply it to the left transmission coil 9. If it is subsequently detected by the left detection means 15 that the wanted transponder TRn has given its response signal RESn, the result will be that the left detection means 15 again generate the first detection signal DS1le. This detection signal DS1le is again supplied to the left scanning signal generation means 12, with the result that the left scanning signal generation means 12 in the next step generate the left scanning signal INTnle and supply it with a current strength having the value I1·¼. If, however, the detection means 15 detect after the provision of the scanning signal INTnle with the left current strength I1·½ that the wanted transponder TRn has not given a response signal RESn any more, the left detection means 15 will generate the second detection signal DS2le, which is again supplied to the left scanning signal generation means 12. This then will have the result that the left scanning signal generation means 12 in the next step generate the left scanning signal INTnle with the left current strength I1·¾ and supply it to the left transmission coil 9. In this process, accordingly, the generated current value is halved in each step, and a switch is made from a current value previously supplied to the transmission coil 9 downward to half this current value or upward by half this current value in steps. For example, if the left transmission coil 9 was previously fed with the current value I1·¼=I1·⅖, then—depending on the detection result—a current strength I1·⅜ or ⅝ will be supplied to the left transmission coil 9. Current value differences decreasing in a time sequence are accordingly formed in this method in changing the left current strength Ile, such that the current strength Ile is either reduced or augmented by the respective current value difference after completion of a step, in dependence on the behavior of the wanted transponder TRn. The process of halving the current value of the left current strength Ile as described above is continued until a current value has been obtained for the left current strength Ile which corresponds at least substantially to the minimum current value difference. The moment this situation has been achieved, the value of that changed left current strength Ile of the left scanning signal INTnle is determined also in this method at which the left scanning signal INTnle was delivered to the left transmission coil 9 after changing of the left current strength Ile with the minimum current value difference.

The same process is followed in an analogous manner by means of the right scanning signal generation means 13 and the right detection means 16 and the right transmission coil 10. After the process steps described above have been carried out in an analogous manner with the right scanning signal generation means 13, the right detection means 16, and the right transmission coil 10, it is possible by means of the left current strength value detection means 18 and the right current strength value detection means 19 as well as the position determination means 24 to determine exactly the position d of the wanted transponder TRn on the basis of the detected values of the two current strengths Ile and Iri.

The method described above differs from the method described with reference to the system 1 of FIG. 1 mainly in that the scanning signals INTnle and INTnri are supplied to the two transmission coils with current strengths Ile and Iri changed in steps of constant current value differences, i.e. each with the minimum current value difference, in the method described with reference to the system 1 of FIG. 1, whereas in the method described immediately above changed current value differences, i.e. reduced current value differences are utilized, such that the minimum current value difference occurs only once both in the left current strength Ile and in the right current strength Iri.

The connections 26, 27, 28, 29, 30, 31, 32, 33, 34, 35 in the system 1 described with reference to FIG. 1 are formed by electrically conducting lines. It should be noted that optical links, for example infrared links, or links operating with radio frequency signals, i.e. also without direct electrical contact, may be provided instead of electrically conducting lines.

The system 1 described with reference to FIGS. 1 and 2 renders possible the determination of the position of a transponder TR with which a wanted object BK is fitted, said wanted object BK being positioned in a one-dimensional row 2 of objects BK. A system according to the invention and a method according to the invention may also be realized in a two-dimensional arrangement of objects and in a three-dimensional arrangement of objects, with the proviso that two transmission coils are no longer sufficient in the case of a two-dimensional arrangement, but that at least four transmission coils are necessary in a two-dimensional arrangement, while a three-dimensional arrangement of at least six transmission coils is necessary in the case of a three-dimensional arrangement of objects.

What is claimed is:

1. A method of determining a position (d) of a wanted object (BKn) which is positioned in a row (2) of objects (BK), said objects (BK) being each provided with a transponder (TR), characterized in that a left scanning signal (INTnle) for triggering a response signal (RESn) of a transponder (TRn), with which the wanted object (BKn) is fitted, is supplied by a left scanning signal generation means (12), with a left current strength (Ile) having a starting value (I1), to a left transmission coil (9) which is provided at a left-hand end of the row (2) of objects (BK), and in that subsequently the left scanning signal (INTnle) for triggering the response signal (RESn) of the transponder (TRn), with which the wanted object (BKn) is fitted, is supplied to the left transmission coil (9) by the left scanning signal generation means (12), with left current strengths (I2, ..., Ii+1, Ii) changed in steps, such that a change in accordance with a minimum current value difference is carried out upon changing of the left current strength (Ile), and in that it is ascertained for each step whether the transponder (TRn), with which the wanted object (BKn) is fitted, has given off the response signal (RESn) triggered by the left scanning signal (INTnle) supplied to the left transmission coil (9) by the left scanning signal (12), and in that a value V(Ii) is determined of that changed left current strength (Ii) of the left scanning signal (INTnle) with which after a change of the left current signal (Ile) in accordance with the minimum current value difference the left scanning signal (INTnle) was supplied to the left transmission coil (9) by the left scanning signal (12), and in that a right scanning signal (INTnri) for triggering the response signal (RESn) from the transponder (TRn), with which the wanted object (BKn) is fitted, is supplied in a first step by a right scanning signal generation means (13) to a right transmission coil (10), which is provided at a right-hand end of the row (2) of objects (BK), with a right current strength (Iri) having a starting value (I1), and in that subsequently the right scanning signal (INTnri) for triggering the response signal (RESn) of the transponder (TRn), with which the wanted object (BKn) is fitted, is supplied to the right transmission coil (10) by the right scanning signal generation means (13) with right current strengths (I2, I3, .., Ik+1, Ik) changed in steps, such that a change in accordance with a minimum current value difference is carried out upon changing of the right current strength (Ile), and in that it is ascertained for each step whether the transponder (TRn), with which the wanted object (BKn) is fitted, has given off the response signal (RESn) triggered by the right scanning signal (INTnri) supplied to the right transmission coil (10) by the right scanning signal generation means (13), and in that a value V(Ik) is determined of that changed right current strength (Ik) of the right scanning signal (INTnri) with which after a change in the right current strength (Iri) in accordance with the minimum current value difference the right scanning signal (INTnri) was supplied to the right transmission coil (10) by the right scanning signal generation means (13), and in that the position (d) of the wanted object (BKn) is determined from the knowledge of said value V(Ii) of the determined changed left current strength (Ii) of the left scanning signal (INTnle) and from the knowledge of said value V(Ik) of the determined changed right current strength (Ik) of the right scanning signal (INTnri).

2. A method as claimed in claim 1, characterized in that the left scanning signal (INTnle) is supplied to the left transmission coil (9) with a maximum left current strength (I1) in the first step, and in that the right scanning signal (INTnri) is supplied to the right transmission coil (10) with a maximum right current strength (Ii) in the first step.

3. A method as claimed in claim 2, characterized in that the left scanning signal (INTnle) is supplied to the left transmission coil (9) with left current strengths (I2, ..., Ii+1, Ii) reduced in steps of substantially constant current value difference, and in that the value V(Ii) is determined of that changed left current strength (Ii) of the left scanning signal (INTnle) at which the transponder (TRn), with which the wanted object (BKn) is fitted, has changed its behavior between delivery and non-delivery of the response signal (RESn) triggered by means of the left scanning signal (INTnle) supplied to the left transmission coil (9), and in that the right scanning signal (INTnri) is supplied to the right transmission coil (10) with right current strengths (I2, I3, ..., Ii+1, Ii) reduced in steps of substantially constant current value difference, and in that the value V(Ik) of that changed right current strength (Ik) of the right scanning signal (INTnri) is determined at which the transponder (TRn), with which the wanted object (BKn) is fitted, has changed its behavior between delivery and non-delivery of the response signal (RESn) triggered by means of the scanning signal (INTnri) supplied to the right transmission coil (10).

4. A method as claimed in claim 3, characterized in that the left scanning signal (INTnle) is supplied to the left transmission coil (9) with left current strengths (I2, ..., Ii1+1, I1) reduced in steps of substantially constant current value difference, and in that the right scanning signal (INTnri) is supplied to the right transmission coil (10) with right current strengths (I2, I3, ..., Ik+1, Ik) reduced in steps of substantially constant current value difference.

5. A method as claims in claim 4, characterized in that the value V(Ii+1) of that reduced left current strength (Ii+1) of the left scanning signal (INTnle) is determined and stored at which the transponder (TRn), with which the wanted object (BKn) is fitted, has given off the response signal (RESn) triggered by the left scanning signal (INTnle) supplied to the left transmission coil (9) for the last time before the transponder (TRn) for the first time has not given such a response signal (RESn) any more, and in that the value V(Ik+1) of that reduced right current strength (Ik+1) of the right scanning signal (INTnri) is determined and stored at which the transponder (TRn), with which the wanted object (BKn) is fitted, has delivered the response signal (RESn) triggered by the right scanning signal (INTnri) supplied to the right transmission coil (10) for the last time before the transponder (TRn) for the first time has not given such a response signal (RESn) any more, and in that the position (d) of the wanted object (BKn) is determined from said value V(Ii+1) of the determined reduced left current strength (Ile) of the left scanning signal (INTnle) and from said value V(Ik+1) of the determined reduced right current strength (Iri of the right scanning signal (INTnri).

6. A method as claimed in claim 1, characterized in that the delivery of the response signal (RESn) by the transponder (TRn), with which the wanted object (BKn) is fitted, triggered by the left scanning signal (INTnle) supplied to the left transmission coil (9) is detected by the left transmission coil (9) for each step of supplying the left scanning signal (INTnle) to the left transmission coil (9) with left current strengths (Ile) changed in steps, and in that the delivery of the response signal (RESn) by the transponder (TRn), with which the wanted object (BKn) is fitted, triggered by the right scanning signal (INTnri) supplied to the right transmission coil (10) is detected by the right transmission coil (10) for each step of supplying the right scanning signal (INTnri) to the right transmission coil (10) with right current strengths (Iri) changed in steps.

7. A system (1) as claimed in claim 1, characterized in that the left scanning signal (INTnle) can be supplied to the left transmission coil (9) with a maximum left current strength (I1) by the left scanning signal generation means (12) in the first step, and in that the right scanning signal (INTnri) can be supplied to the right transmission coil (10) with a maximum right current strength (Ii) by the right scanning signal generation means (13) in the first step.

8. A system (1) as claimed in claim 7, characterized in that the left scanning signal (INTnle) can be supplied to the left transmission coil (9) with left current strengths (I2, . . . , Ii+1, Ii) changed in steps of substantially constant current value difference by the left scanning signal generation means (12), and in that the value V(Ii+1) of that changed left current strength (Ii+1) of the left scanning signal (INTnle) can be determined by the left current strength value detection means (18) at which the transponder (TRn), with which the wanted object (BKn) is fitted, has changed its behavior between delivery and non-delivery of the response signal (RESn), and in that the right scanning signal (INTnri) can be supplied to the right transmission coil (10) with right current strengths (I2, I3, . . . , Ik+1, Ik) changed in steps of substantially constant current value difference by the right scanning signal generation means (13), and in that the value of that changed right current strength (Ik+1) of the right scanning signal (INTnri) can be determined by the right current strength value detection means (19) at which the transponder (TRn), with which the wanted object (BKn) is fitted, has changed its behavior between delivery and non-delivery of the response signal (RESn).

9. A system (1) as claimed in claim 8, characterized in that the left scanning signal (INTnle) can be supplied to the left transmission coil (9) with reduced left current strengths (I2, . . . , Ii+1, I1, . . . , Iz) changed in steps of substantially constant current value differences by the left scanning signal generation means (12), and in that the right scanning signal (INTnri) can be supplied to the right transmission coil (10) with reduced right current strengths (I2, I3, . . . , Ik+1, Ik, . . . , Iz) in steps of substantially constant current value differences by the right scanning signal generation means (13).

10. A system (1) as claimed in claim 9, characterized in that the left current strength value detection means (18) are constructed for determining and storing the value V(Ii+1) of that reduced left current strength (Ii+1) of the left scanning signal (INTnle) at which the transponder (TRn), with which the wanted object (BKn) is fitted, has supplied the response signal (RESn) triggered by the left scanning signal (INTnle) supplied by the left transmission coil (9) for the last time before the transponder (TRn) for the first time has not given such a response signal (RESn) any more, and in that the right current strength value detection means (19) are constructed for determining and storing the value V(Ik+1) of that reduced right current strength (Ik+1) of the right scanning signal (INTnri) at which the transponder (TRn), with which the wanted object (BKn) is fitted, has supplied the response signal (RESn) triggered by the right scanning signal (INTnri) supplied to the right transmission coil (10) for the last time before the transponder (TRn) for the first time has not given such a response signal (RESn) any more, and in that the position determination means (24) are constructed for determining the position (d) of the wanted object (BKn) from said value V(Ii+1) of the determined reduced left current strength (Ii+1) of the left scanning signal (INTnle) and from said value V(Ik+1) of the determined reduced right current strength (Ik+1) of the right scanning signal (INTnri).

11. A system (1) for determining the position (d) of a wanted object (BKn) which is positioned in a row (2) of objects (BK), said objects (BK) being each provided with a transponder (TR), characterized in that a left transmission coil (9) is provided which is arranged at a left-hand end of the row (2) of objects (BK), and in that left scanning signal generation means (12) are provided such that said left scanning signal generation means (12) can supply a left scanning signal (INTnle) for triggering a response signal (RESn) of a transponder (TRn), with which the wanted object (BKn) is fitted, in a first step to the left transmission coil (9) with a left scanning signal (Ile) having a starting value (Ii), and through which subsequently the left scanning signal (INTnle) can be supplied to the left transmission coil (9) with current strengths (I2, . . . , I1+1, Ii, . . . ,Iz) changed in steps, and through which a change in the left current strength (Ile) in accordance with a minimum current value difference is achievable, and in that left detection means (15) are provided such that it can be ascertained whether the transponder (TRn), with which the wanted object (BKn) is fitted, has given off the response signal (RESn) triggered by the left scanning signal (INTnle) supplied to the left transmission coil (9), and in that left current strength value detection means (18) are provided through which a value V(Ii) can be determined of that changed left current strength (Ii) of the left scanning signal (INTnle) with which after a change in the left scanning signal (INTnle) was supplied to the left transmission coil (9), and in that a right transmission coil (10) is provided which is arranged at a right-hand end of the row (2) of objects (BK), and in that right scanning signal generation means (13) are provided such that said right scanning signal generation means (13) can supply the right scanning signal (INTnri) for triggering the response signal (RESn) of the transponder (TRn), with which the wanted object (BKn) is fitted, in a first step to the right transmission coil (10) with a right current strength (Iri) having a starting value (Ii), and through which subsequently the right scanning signal (INTnri) can be supplied to the right transmission coil (10) with current strengths (I2, I3, . . . , Ik+1, Ik, . . . , Iz) changed in steps, and by through which a change in the right current strength (Iri) in accordance with a minimum current value difference is achievable, and in that right detection means (16) are provided by means of which it can be ascertained whether the transponder (TRn), with which the wanted object (BKn) is fitted, has given off the response signal (RESn) triggered by the right scanning signal (INTnri) supplied to the right transmission coil (10), and in that right current strength value detection means (19) are provided through which a value V(Ik) can be determined of that changed right current strength (Ik) of the right scanning signal (INTnri) with which after a change in the right current strength (Iri) in accordance with the minimum current value difference the right scanning signal (INTnri) was supplied to the right transmission coil (10), and in that position determination means (24) are provided through which the position (d) of the wanted object (BKn) can be determined from the knowledge of said value V(Ii) of the determined changed left current strength (Ii) of the left scanning signal (INTnle) and from the knowledge of said value V(Ik) of the determined changed right current strength (Ik) of the right scanning signal (INTnri).

* * * * *